(12) United States Patent
Jones

(10) Patent No.: US 12,551,502 B1
(45) Date of Patent: Feb. 17, 2026

(54) TESTOSTERONE ENHANCING COMPOSITIONS AND METHODS

(71) Applicant: Direct Digital LLC, Charlotte, NC (US)

(72) Inventor: Natalie Jones, Charlotte, NC (US)

(73) Assignee: Direct Digital, Charlotte, NC (US)

( * ) Notice: Subject to any disclaimer, the term of this patent is extended or adjusted under 35 U.S.C. 154(b) by 0 days.

(21) Appl. No.: 19/094,018

(22) Filed: Mar. 28, 2025

(51) Int. Cl.
| | |
|---|---|
| *A61K 31/198* | (2006.01) |
| *A61K 31/4415* | (2006.01) |
| *A61K 31/593* | (2006.01) |
| *A61K 31/69* | (2006.01) |
| *A61K 31/714* | (2006.01) |
| *A61K 33/30* | (2006.01) |
| *A61K 35/10* | (2015.01) |
| *A61K 36/185* | (2006.01) |
| *A61K 36/31* | (2006.01) |
| *A61K 36/45* | (2006.01) |
| *A61K 36/736* | (2006.01) |
| *A61K 36/74* | (2006.01) |
| *A61K 36/82* | (2006.01) |
| *A61K 36/9066* | (2006.01) |
| *A61P 5/26* | (2006.01) |
| *A61P 25/00* | (2006.01) |

(52) U.S. Cl.
CPC ........... *A61K 33/30* (2013.01); *A61K 31/198* (2013.01); *A61K 31/4415* (2013.01); *A61K 31/593* (2013.01); *A61K 31/69* (2013.01); *A61K 31/714* (2013.01); *A61K 35/10* (2013.01); *A61K 36/31* (2013.01); *A61K 36/45* (2013.01); *A61K 36/5777* (2024.05); *A61K 36/736* (2013.01); *A61K 36/742* (2024.05); *A61K 36/82* (2013.01); *A61K 36/9066* (2013.01); *A61P 5/26* (2018.01); *A61P 25/00* (2018.01)

(58) Field of Classification Search
CPC .. A61K 33/30; A61K 31/198; A61K 31/4415; A61K 31/593; A61K 31/69; A61K 31/714; A61K 35/10; A61K 36/31; A61K 36/45; A61K 36/5777; A61K 36/736; A61K 36/742; A61K 36/82; A61K 36/9066; A61P 5/26; A61P 25/00
See application file for complete search history.

(56) References Cited

U.S. PATENT DOCUMENTS 10,668,097 B1 * 6/2020 Jones .................... A61K 47/46

FOREIGN PATENT DOCUMENTS

WO    WO 2019215755 A2    11/2019

OTHER PUBLICATIONS

Henkel et al. (Phytother. Res. 28: 544-550 (2014)) (Year: 2014).*
Nemzer et al. (Free Radical Research 2017; DOI: 10.1080/10715762.2017.1390228; 12 pages) (Year: 2017).*
Pandit et al. (Int. J. Med. Sci. 2022;19:1290-1299) (Year: 2022).*
Bruno, G. (Nutritional Outlook [online] retrieved on May 12, 25 from: https://www.nutritionaloutlook.com/view/men-s-sexual-health-supporting-testosterone-and-nitric-oxide-production-with-nutraceuticals; 2021:7 pages) (Year: 2021).*
Pattnaik et al. (Dec. 21, 2022) Nutritional Elements in Sleep. Cureus 14(12):9 pages). (Year: 2022).*
Ahmad et al. (Trop J Nat Prod Res. 2023;7(5):3002-3008) (Year: 2023).*
Toyama et al. (Abstract of: Jpn Pharmacol Ther. 2022;50:871-6; 2 pages). (Year: 2022).*
Srivastava, Manoj et al., "A combination of Punica Granatum . . . ," Int. J. Med Sci., vol. 22, pp. 383-397 (2025).
Pandit, S. L et al., "A proprietary blend of standardized . . . ," Int. J. Med. Sci., vol. 13, pp. 1290-1299 (2022).
Sreeramaneni, P. et al., "A proprietary herbal blend containing . . . ," Journal of Dietary Supplements, vol. 20, No. 4 pp. 1-17 (2022).
Steels, E et al., "Physiological Aspects . . . ," Phytotherapy Research, John Wiley & Sons, 2011.

* cited by examiner

*Primary Examiner* — Ernst V Arnold
(74) *Attorney, Agent, or Firm* — Barbara E. Johnson, Esq.

(57) ABSTRACT

The present invention is a nutraceutical, and method of administering it, to create both a rapid increase in free and total testosterone in the bloodstream as well as modulation of sleep cycles to a PSQI score of 5 or lower, including the key ingredients of 1 mg zinc (chelated or zinc citrate); 1125 mg L-Citrulline Malate (2:1); 400 mg Tesnor® (Pomegranate peel and cocoa bean extracts); 150 mg of elevATP®, an adenosine triphosphate (ATP) stimulating composition containing peat extract and apple fruit extract; 100-150 mg Tongkat Ali (*Eurycoma longifolia*) root extract, and 10 mg boron as boron glycinate, together with one or more excipients. The combination of these ingredients, together with optional Vitamin B6, Vitamin B12, and Vitamin D, and optional 25 mg of S7® (green coffee extract (bean), green tea extract (leaf), turmeric extract (rhizome), sour cherry (fruit), blueberry (fruit), broccoli (flower), and kale (leaf)) gives new and unexpectedly improved results over any of the constituents administered alone or in any other combination.

6 Claims, No Drawings

TESTOSTERONE ENHANCING COMPOSITIONS AND METHODS

FIELD OF THE INVENTION

The present invention generally relates to compositions and methods for enhancing both free and total testosterone in an accelerated way, while promoting overall well-being, particularly healthy sleep cycles, using a novel oral nutraceutical capsule composition.

BACKGROUND

Free and total testosterone are essential for good health and vitality, particularly in men. However, as male subjects age, testosterone levels decline, resulting in increased fatigue, decrease in athletic performance, decrease in power, inability to focus, decrease in muscle tone, decrease in stamina, and decreased libido. There is a need for an effective method of safely increasing free and total testosterone levels, especially when the increase in testosterone levels can be accomplished with otherwise beneficial nutraceutical ingredients. As with many nutraceuticals, of course, a concomitant goal is to reduce or eliminate any unwanted effects. Over time, for instance, many nutraceuticals have encountered consumer reaction that this or that product created an unwanted "buzz" or stimulated (physical or mental or both) effect, especially when the nutraceutical included caffeine- or theobromine-containing ingredients, with the action of a such constituents' sometimes (not always) being a predictable result. In the context of testosterone boosting in an aging male population, a concomitant goal is a wellness approach to sleep and sleep-cycle modulation, because the same population—in which free and total testosterone increase in the bloodstream is desired—is also a population in which healthy sleep cycle modulation is also important. This sleep-cycle modulation initiative is particularly desirable in populations that do not wish to eliminate caffeine or theobromine intake. Accordingly, a need remains for a nutraceutical composition and treatment method in which both free and total testosterone can be optimally and effectively boosted with multiple, synergistic active nutraceutical agents, while simultaneously modulating healthy sleep cycles even in the presence of some caffeine and/or theobromine consumption, all from the same dosing regimen.

SUMMARY OF THE INVENTION

In order to meet this need, the present invention is both a composition, and a method of treatment by administering it, in which a particular nutraceutical formulation contains the following ingredients in engineered and cooperatively balanced amounts, with amounts shown as per capsule dosage form and with the dosage (serving size) being 3 capsules daily. Each capsule contains one or more pharmaceutically acceptable excipients such as gelatin, rice flour, magnesium stearate or silica together with certain optional ingredients, namely, 2 mg Vitamin B6 (optional); 2.4 mcg Vitamin B12 (optional); 20 mcg Vitamin D (cholecalciferol) (optional); and 25 mg of S7® (green coffee extract (bean), green tea extract (leaf), turmeric extract (rhizome), sour cherry (fruit), blueberry (fruit), broccoli (flower), and kale (leaf)) (optional). The capsule always contains the following essential ingredients, namely: 1 mg zinc (can be chelated zinc, or zinc citrate); 1125 mg L-Citrulline Malate (2:1); 400 mg Tesnor® (Pomegranate peel and cocoa bean extracts); 150 mg of elevATP®, an adenosine triphosphate (ATP) stimulating composition containing peat extract and apple fruit extract; 100-150 mg Tongkat Ali (*Eurycoma longifolia*) root extract and 10 mg boron as boron glycinate. Both the identity and amounts of the essential ingredients are critical and contribute to the new and unexpectedly improved results possible with the present invention, namely, a much faster increase in both free and total Testosterone levels in the blood of a human patient user than are possible otherwise, together with a well-being enhancing effect, all critically balanced by the sleep-cycle modulating effects of the combined Tongkat Ali, zinc, Tesnor® and boron glycinate compounded together. Indeed, the inventor attributes both the improved boosting effect as to both free and total testosterone, and the improved sleep-cycle modulation, to this specific combination of the Tongkat Ali, zinc, Tesnor® and boron glycinate. The sleep-cycle modulating effects are quantifiable according to the Pittsburgh Sleep Quality Index (PSQI) evaluated at baseline and on days within 100 days of onset of treatment. This critical balancing and sleep-cycle modulation is made possible in important part by the surprising ability of Tesnor® to module healthy sleep cycles when combined with Tongkat Ali, zinc, and boron glycinate in the stated amounts, and notwithstanding the inclusion of the elevATP. Even when the optional S7® ingredient is not present in the composition, the present nutraceutical provides the same sleep-modulation effects even when a comparable amount of caffeine or theobromine (or both) is included in the concomitant dietary intake.

DETAILED DESCRIPTION OF THE INVENTION

The present invention is a composition, and treatment method, for boosting free and total testosterone with much faster progressions than previously possible, while at the same time enhancing well-being and demonstrably modulating sleep cycles of male patients undertaking such treatment in a concrete, documentable way. As will be apparent from the descriptions provided below, the carefully engineered nutraceutical dosage form accomplishes both of accelerated testosterone-boosting and ATP stimulation while surprisingly, at the same time, objectively modulating sleep cycles to an optimal paradigm despite the inclusion of the elevATP (essential) and S7® (optional) components, even (or especially) in the instance of comparable caffeine or theobromine dietary consumption even when the S7® component is not present. The new and surprisingly improved results of the disclosed and claimed composition, as well as its administration, thus inheres in the combined rapid free and total testosterone increases matched by surprising sleep cycle modulation, as disclosed further below and as attributable to the important combination of the Tesnor® with the Tongkat Ali, zinc, and boron glycinate in the stated amounts or ranges.

Each capsule form of the present composition contains one or more pharmaceutically acceptable excipients such as gelatin, rice flour, magnesium stearate, or silica, or all four ingredients; 2 mg Vitamin B6 (optional); 2.4 mcg Vitamin B12 (optional); 20 mcg Vitamin D (cholecalciferol)) (optional); and 25 mg of S7® (green coffee extract (bean), green tea extract (leaf), turmeric extract (rhizome), sour cherry (fruit), blueberry (fruit), broccoli (flower), and kale (leaf)) (optional). Each capsule always contains the following essential ingredients and their essential respective amounts, namely: 1 mg zinc (chelated or zinc citrate); 1125 mg L-Citrulline Malate (2:1); 400 mg Tesnor® (Pomegranate peel and cocoa bean extracts); 150 mg of elevATP®, an adenosine triphosphate (ATP) stimulating composition containing peat extract and apple fruit extract; 100-150 mg Tongkat Ali (*Eurycoma longifolia*) root extract and 10 mg boron as boron glycinate. The dosing for an adult male is 3 capsules per day, to achieve the reported benefits described below.

Before reviewing the new and unexpectedly improved results achievable with the present nutraceutical compositions and methods, each individual component is further described below, with the exception of the already-well-known ingredients of Vitamins D, Vitamin B6, Vitamin B12, zinc (chelated or zinc citrate), L-Citrulline Malate (2:1) and boron glycinate, all of which are already well known for use in nutraceutical compositions of various kinds (but not known for use in the present combination).

Tesnor® is a relatively new testosterone-boosting composition, the incorporation of which here has led to a surprising further improvement in the context of the current formulation. Tesnor® is a known extract of pomegranate peel and cocoa bean, such as has been published (for example) by Sreeramaneni, Poorna G. A. et. al, "A Proprietary Herbal Blend Containing Extracts . . . ," *Journal of Dietary Supplements*, vol. 20, no. 4, pp 1-17 (2022). The reference to "proprietary" does not refer to lack of available information, because the composition is disclosed and published in, for example, WO 2019215755 and documented in the literature. As first identified upon the creation of the combination disclosed and claimed herein, the newly identified ability of the Tesnor® to modulate sleep cycles when combined with Tongkat Ali, zinc and boron glycinate in the present composition—even in the presence of the elevATP or S7® components—has not been taught or suggested in any prior art related to Tesnor® (or in any other free testosterone-boosting prior art known to the inventor, for that matter).

The constituent elevATP® is also known in the prior art, although not known for incorporation in the present specific admixture disclosed herein. The elevATP component is a commercially available combination of ancient peat and apple polyphenols that is believed to work to enhance indirectly the ability of the body to produce adenosine triphosphate (ATP). Although an equivalent combined extract of peat and apple polyphenols may be substituted, elevATP is available from Futureceuticals of Momence, IL for commercial purchase.

The ingredient Tongkat Ali (*Eurycoma longifolia*) root extract is currently available from several commercial suppliers and is also known as long jack or longjack extract. The plant is native to Indochina (Cambodia, Laos, Malaysia, Myanmar, Thailand and Vietnam) and Indonesia (the islands of Borneo and Sumatra), but has also been found in the Philippines. Although not a true ginseng, colloquially *Eurycoma longifolia* is sometimes referred to as Malaysian Ginseng, and as both a flower and an extract is widely commercially available.

The S7® constituent of the present invention is also available from Futureceuticals, of Momence, IL, and contains seven herbal components to serve as a nitric oxide booster. The seven herbal components are green coffee extract (bean), green tea extract (leaf), turmeric extract (rhizome), sour cherry (fruit), blueberry (fruit), broccoli (flower), and kale (leaf). These seven ingredients and their nutraceutical action largely speak for themselves.

The excipient component(s) of the invention are standard nutraceutical additives. A typical formulation includes all four of gelatin, rice flour, magnesium stearate and silica, although these may be used in the alternative also. In some embodiments, the excipient may be a coloring agent. In some embodiments, the excipient may be a diluent. In some embodiments, the excipient may be a binder. In some embodiments, the excipient may be a granulating agent. In some embodiments, the excipient may be a bulking agent. In some embodiments, the excipient may be a disintegrant. In some embodiments, the excipient may be a glidant. In some embodiments, the excipient may be a flavorant. In some embodiments, the excipient may be a buffer. In some embodiments, the excipient may be a surfactant. In some embodiments, the excipient may be a stabilizer. In some embodiments, the excipient is selected from sugars, starches, polymers, alkaline and/or alkali earth stearate, carbonate and/or sulfate, kaolin, silica, flavorants, and aromas, and combinations of any thereof. In some embodiments, the excipient may be lipophilic, polymeric, cellulosic or combinations of any thereof. In some embodiments, the excipient may be selected from lactose, magnesium stearate, sodium carbonate, microcrystalline cellulose, silica, titanium dioxide, rice flour, and combinations of any thereof. According to embodiments, the composition may be encapsulated. According to embodiments, the capsule may be a gelatin capsule. Notwithstanding this described variability of excipients, the present compositions must always contain the ingredients, and amounts, of the essential constituents described in detail above, together with at least one pharmaceutically or nutraceutically acceptable excipient, in order to achieve the new and unexpected results of the invention.

The present ingredients and amounts were developed after extensive trial and error testing, to obtain the optimal engineered balance to achieve all the stated objectives at once—elevated free and total testosterone, increased ATP production by the body, and quantifiable modulation of sleep cycle activity in an optimal paradigm notwithstanding the presence of the ingredients in the S7® or any comparable intake of caffeine or theobromine as an exogenous dietary component. The counterintuitive combination of elevATP® with optional S7® and Tesnor® led to surprisingly new and unexpected results when the Tesnor was specifically combined with all of Tongkat Ali, zinc, and boron glycinate. The importance of the essential ingredients and amounts are further illustrated in the following Examples.

Example 1

Twenty human subjects consume, as an oral dose, three capsules daily for 90 days. Each capsule contains 20 mcg Vitamin D (cholecalciferol); 1 mg zinc citrate; 1125 mg L-Citrulline Malate (2:1); 400 mg Tesnor® (Pomegranate peel and cocoa bean extracts); 150 mg of elevATP®, an adenosine triphosphate (ATP) stimulating composition containing peat extract and apple fruit extract, 150 mg Tongkat Ali (*Eurycoma longifolia*) root extract; 25 mg of S7® (green coffee extract (bean), green tea extract (leaf), turmeric extract (rhizome), sourcherry (fruit), blueberry (fruit), broccoli (flower), and kale (leaf)) and 10 mg boron as boron glycinate. Significant free and total testosterone boosting (increase of free and total testosterone levels in the bloodstream) occurs at 56 days or sooner, and sleep cycle modulation is apparent with global PSQI (Pittsburgh Sleep Quality Index) scores of under 5 as a mean result for all participants, starting at day 28 and persisting through day 100. PSQI measures sleep quality, latency duration, habitual sleep efficiency, sleep disturbances, use of sleep medication and daytime dysfunction all as a matter of self-rated questionnaire data collection, and only when global PSQI scores exceed 5 is sleep deemed to be poor. Each subject here reports a PSQI of 5 or lower and a minimal change from baseline to the end of the study of 2 points. The critical components believed to be responsible for the improved boosting of both free and total testosterone and excellent sleep modulation effects are the combination of the Tesnor® with Tongkat Ali, zinc, and boron glycinate Example 2

The present nutraceutical composition, and test protocols, are created and conducted identically to Example 1 except that the Vitamin D and the S7® components are eliminated from the capsule composition. and Vitamin B6 and B12 are added in the amounts of 2 mg B6 and 2.4 mcg B12. Otherwise the 100 day protocol, dosing and testing are the same. Each subject reports global PSQI test scores of 5 or lower and significant increase of free testosterone at 56 days or sooner, even in the absence of the Vitamin D and S7®. Each subject reports a global PSQI of 5 or lower with a minimal change from baseline to the end of the study period of 2 points. Surprisingly, however, the addition of the Vitamins B6 and B12 do not affect the sleep results reported, even though Vitamins B6 and B12 are generally known for their good sleep-cycle modulating effects. This suggests that the combination of the Tesnor® with Tongkat Ali, zinc, and boron glycinate is such a reliable sleep cycle modulator that the additional sleep-cycle benefit of the B6 and B12 are not needed for their sleep value, notwithstanding their other nutritional benefits to the composition.

Example 3

The present nutraceutical composition, and test protocols, are created identically to Example 2 except that instead of 150 mg of Tongkat Ali, 100 mg of Tongkat Ali are included per capsule with no other change. During 100 days of dosing and following with the modified nutraceutical, predominantly the same global PSQI scores (under 5, above-referenced minimal reduction of 2 points) are logged for the nutraceutical dosed at 3 capsules per day. The inventor believes that the combination of the Tesnor® with even just 100 mg Tongkat Ali, L-Citrulline Malate (2:1), zinc, and boron glycinate is such a synergistic combination that even in the absence of Vitamins B6, B12 or D, as well as either in the presence or absence of the S7®, the sleep-cycle modulation is surprisingly reliable and consistent and goes hand-in-hand with the fast-onset testosterone boosting and sleep-cycle modulation now possible. In other words, the present composition and methods provide new and unexpectedly improved results over the administration of Tesnor® alone OR Tesnor® in any other permutation or combination of ingredients not matching the essential, critical components of the present invention in capsule form.

Although the invention has been described with particularity, above, it is to be limited only insofar as is set forth in the accompanying claims.

I claim:

1. A method for simultaneously modulating sleep cycles and increasing free and total testosterone in the blood in a human in need of such dual treatment, consisting essentially of the steps of: compounding a capsule containing a) 1 mg zinc selected from the group consisting of zinc citrate and chelated zinc; b) 1125 mg citrulline maleate; c) 400 mg pomegranate peel and cocoa bean extracts; d) 150 mg of an adenosine triphosphate stimulating composition containing peat extract and apple fruit extract; 3) 150 mg *Eurycoma longifolia* extract and 10 mg boron glycinate, together with one or more pharmaceutically acceptable excipients, and dosing said human with a dosing protocol of administering three of said capsules per day to said human for a plurality of days and realizing both free and total testosterone increase and beneficial sleep cycle modulation over said plurality of days.

2. The method according to claim 1, wherein the step of compounding in a capsule includes the further addition of f) 2 mg Vitamin B6 and 2.4 micrograms of Vitamin B12.

3. The method according to claim 1, wherein the step of compounding a capsule includes the further addition of 20 mcg Vitamin D and 25 mg of a combination of green coffee bean extract, green tea leaf extract, turmeric rhizome extract, sour cherry fruit, blueberry fruit, broccoli flower, and kale leaf, and wherein said plurality of days is between 28 and 56 days.

4. The method of claim 1, wherein said monitoring step includes confirming that modulation of sleep cycles conforms to a score of 5 or lower on the Pittsburgh Sleep Quality Index.

5. A capsule product obtained by the method of claim 1.

6. The capsule product according to claim 5 wherein said capsule product is a gelatin capsule product.

* * * * *